Oct. 8, 1963    R. E. RISLEY ET AL    3,106,069
METHOD OF COUPLING SUBMERGED SECTIONS OF PIPE
Original Filed Nov. 17, 1955    6 Sheets-Sheet 2

INVENTORS.
ROGER E. RISLEY &
FREDERICK T. NEWELL
BY Robert A. Burns
ATTORNEY

INVENTORS.
ROGER E. RISLEY &
FREDERICK T. NEWELL
BY
*Robert E. Burns*
ATTORNEY

INVENTORS.
ROGER E. RISLEY &
FREDERICK T. NEWELL

INVENTORS.
ROGER E. RISLEY &
FREDERICK T. NEWELL
ATTORNEY

United States Patent Office 3,106,069
Patented Oct. 8, 1963

3,106,069
METHOD OF COUPLING SUBMERGED
SECTIONS OF PIPE
Roger E. Risley and Frederick T. Newell, Bradford, Pa., assignors to Dresser Industries, Inc., Dallas, Tex., a corporation of Delaware
Original application Nov. 17, 1955, Ser. No. 547,514, now Patent No. 2,922,664, dated Jan. 26, 1960. Divided and this application June 10, 1958, Ser. No. 741,107
2 Claims. (Cl. 61—43)

This invention relates to the installation of pipe couplings to interconnect sections of pipe, and is more particularly concerned with the installation of pipe couplings having sealing means actuated by fluid means, especially fluid means having settable or hardening characteristics. The method of installing pipe couplings to which this invention relates are particularly suitable for joining pipes in underwater installations and in installations in which accessibility of the exterior of the pipe line is limited.

Pipe lines for the transmission of oil, water, gas and the like are customarily formed from a plurality of sections of steel pipe, which are interconnected by coupling elements. These coupling elements are generally of a type which provides a fluid-tight seal between the pipe sections but at the same time provides a sufficiently flexible joint to accommodate the expansion and contraction of the pipe line under the conditions of service. Flexible couplings commonly in use consist of sleeves or middle rings which are slipped over the ends of the adjacent pipe sections, and "followers" which are slipped over the pipe sections on each side of the middle ring and are then drawn against the ends of the middle ring by means of bolts. Suitable gaskets placed at the ends of the middle rings are compressed by the action of the followers to provide a fluid-tight seal. Pipe lines, however, pass over various types of terrain and in many cases when, for example, bridges are not available for supporting the pipe line across a river, lake or other body of water, it may be necessary to lay the pipe line on the bed of the river or lake across which the pipe must pass. Because of geological conditions or the location of the right of way for the pipe line it is often not possible to skirt the body of water and thus to avoid the necessity of laying the pipe line through it. Many of these bodies of water are relatively deep and the stretch of water through which the pipe line must be laid may be substantially great. In other cases it is desired to provide a water intake for a municipal water supply or for some industrial use, with the opening of the intake at a substantial distance off-shore and at a point of appreciable depth.

In most cases, the pipe line must be laid by the progressive coupling of the pipe sections on the bed of the body of water, and it is not generally feasible to couple the pipe sections above the surface and then to lower them to the bed. The coupling of the pipe line sections on the river or lake bed with conventional couplings, however, has been found to be very difficult, and in some cases almost impossible, because of the physical hazards and obstructions encountered. It is necessary to use divers for this purpose and when the river or lake bottom is very silty, the least movement of the diver stirs up the silt and destroys visibility to such an extent that the diver must work entirely by torch. This makes the task of coupling the pipe sections exceedingly difficult and time-consuming, and great skill is required on the part of the diver to insure proper installation of the coupling. Since divers are highly-skilled and highly paid workers, such operations greatly add to the cost of the laying of the pipe line.

It is an object of the invention to provide an improved method of coupling the sections of pipe lines being laid on the beds of lakes, rivers and other bodies of water.

In accordance with the invention, there is employed a pipe coupling formed from a cylindrical sleeve provided with at least one radial channel or groove for receiving a packing gasket or like sealing means and to accommodate a continuous body of a fluid material on the radially-outward side of the sealing means to force the sealing means into sealing engagement with the pipe, inlet means for introducing a fluid into the channel or channels on one radial side of the sleeve, outlet means for removing fluid from the channel or channels at the opposite radial side of the sleeve, the inlet and outlet means of the sleeve being connectible respectively with conduit means for supplying fluid to the fluid inlet means and for removing fluid from the outlet means.

In accordance with the method of the invention, the coupling sleeve with the packings or gaskets in the radial groove or grooves is mounted on one end of a new pipe section to be coupled in the pipe line being laid, the necessary connections for supplying fluid to the fluid inlet means and for removing fluid from the fluid outlet means of the coupling being connected. The coupling and the associated pipe are then guided onto the free end of the pipe section which is already in place. The fluid is thereupon pumped into the radial grooves to press the gaskets into sealing engagement with the associated pipe sections to any predetermined pressure, and the installation is complete. In carrying out the method of the invention in the installation of underwater pipe lines, the coupling and the associated pipe, after the necessary connections for supplying fluid to the inlet means and for removing fluid from the outlet means have been made, are lowered into the water and the coupling end is guided by a diver onto the pipe section lying on the bed of the body of water. These are steps which can be carried out rapidly and efficiently.

It is a feature of the invention that in underwater installations the only underwater operation required in installing the sleeve is the guiding of the open sleeve end onto the free end of the previously laid pipe section, the remaining operation of sealing the sleeve to the pipe sections being effected and controlled from above the surface of the water.

Other objects and features of the present invention will be readily apparent from the following detailed description and from the accompanying drawings wherein FIG. 1 is an end elevation of an underwater pipe coupling assembly being installed in accordance with the method of the invention and showing, diagrammatically, the manner of connecting the coupling to the fluid supply above the surface of the water;

Figure 1:
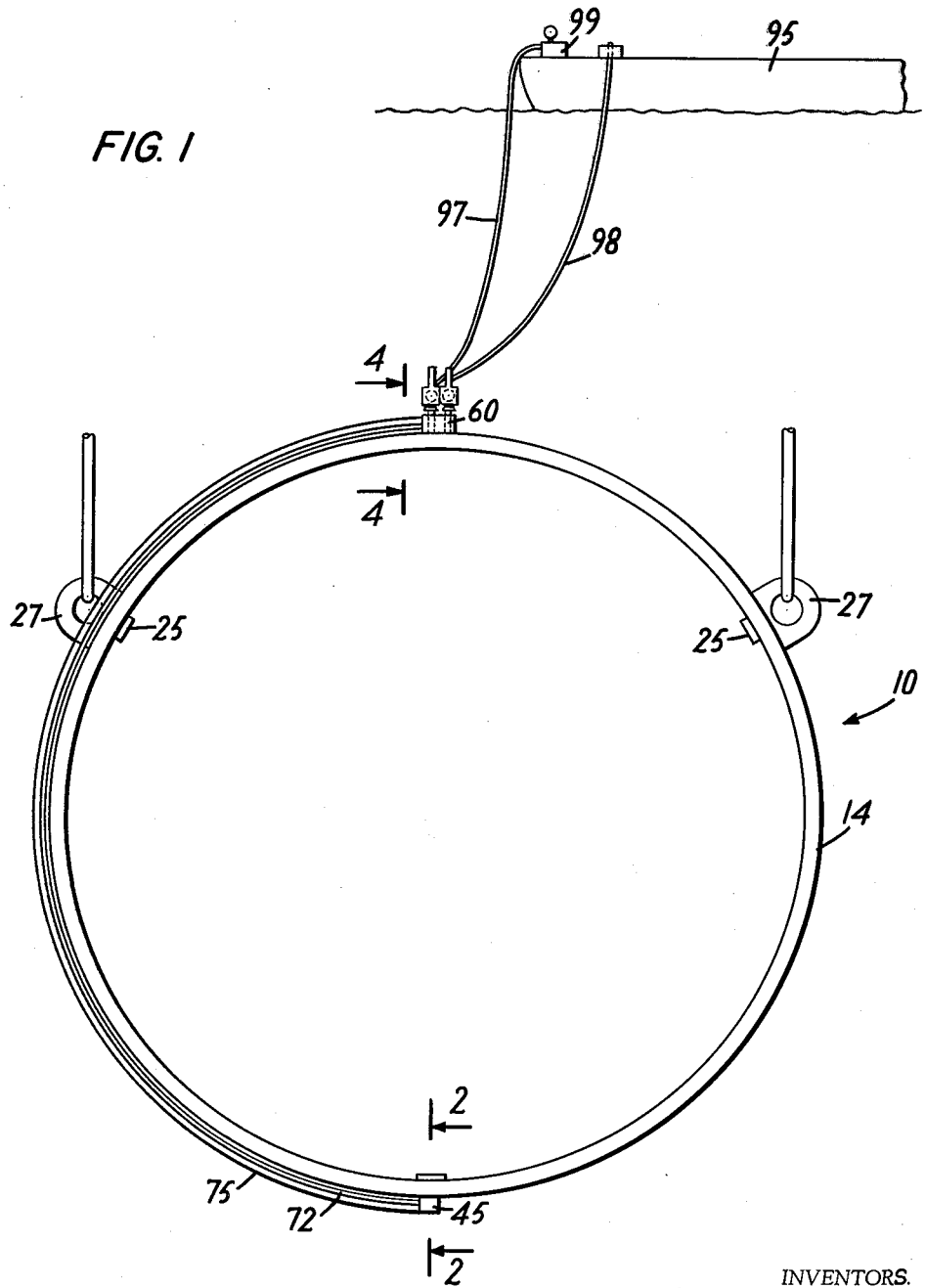
Figure 2:
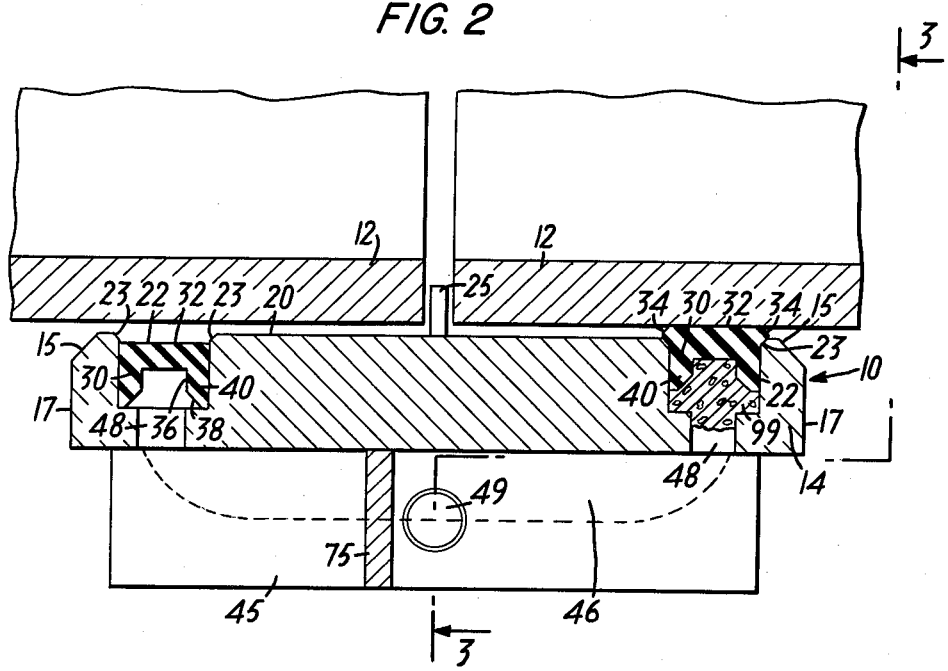
FIG. 2 is a longitudinal sectional view of the coupling shown in FIG. 1 and taken approximately along the line 2—2 of FIG. 1.

Referring to the drawings, and more particularly to FIG. 1, the reference numeral 10 designates generally the underwater coupling illustrated. The coupling 10, which is shown in installed position on the pipe sections 12 (FIG. 2), is formed from a continuous tubular sleeve 14 which has its radially-inner edges chamfered, as indicated at 15, adjacent the end faces 17. For reception of the fluid-actuated sealing gaskets and the necessary fluid to apply a radially-inwardly directed pressure upon the gaskets, the inner face 20 of the sleeve 14 is formed with annular channels or grooves 22 which serve as gasket recesses and which extend completely around the sleeve and are spaced axially-inwardly of the chamfered portions of the end faces 17. In the embodiment illustrated, the gasket channels or recesses 22 are rectangular in cross section and the edges of the channels which merge with the inner face 20 are slightly chamfered as shown at 23, e.g. by a $\frac{1}{32}''$ bevel. To permit automatic centering of the sleeve upon the pipe sections, as shown in FIG. 2, centering stops 25 extend radially inwardly at circumferentially spaced-apart points as indicated in FIG. 1. Externally, the sleeve 14 is provided with circumferentially spaced-apart ears or lugs 27, the purpose of which will be apparent as the description proceeds.

Receivable in the annular channels 22 are annular gaskets or packing rings 30. As shown in FIG. 2, the gaskets 30 are dimensioned to fit snugly but radially-movably in the channels 22 for movement into engagement with the pipe surface. The pipe-engaging surface 32 of each gasket lies in a cylindrical surface concentric with the axis of the sleeve 14 and the sides 34 of each gasket lie against the adjacent walls of the channels. The fourth side of the gasket is formed with an annular groove 36 extending substantially into the body of the gasket. As shown in FIG. 2, groove 36 has a main body portion, which gives the bottom and sides of the gasket substantially the same thickness, and an outwardly-diverging throat portion 38 which defines gradually-thinning lips 40 along the radially-outer ends of the gasket to increase the flexibility of these portions of the gasket.

It will be noted that the radial dimension of each gasket 30 is less than the radial dimension or depth of its associated channel 22. As a result, when the gasket is fully seated in the channel it does not extend into the interior opening of the coupling sleeve and thus is protected from being damaged upon insertion of pipe sections 12 when the coupling is installed. Moreover, the gaskets 30 are of the self-sealing type, the sealing action becoming greater the greater the pressure in the fluid actuating the gaskets. The fluid pressure presses the flexible lips 40 firmly against the side walls of the channels 22 and the lips seal against escape of the fluid from the channels.

Figure 2A:
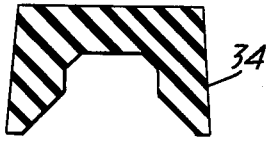
FIG. 2A is a sectional view, on an enlarged scale, of the gasket shown in FIG. 2 in free position before confinement in the gasket channel of the coupling sleeve.
Figure 2B:
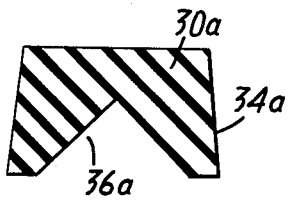
FIG. 2B is a similar view of a modified form of gasket.
Figure 3:
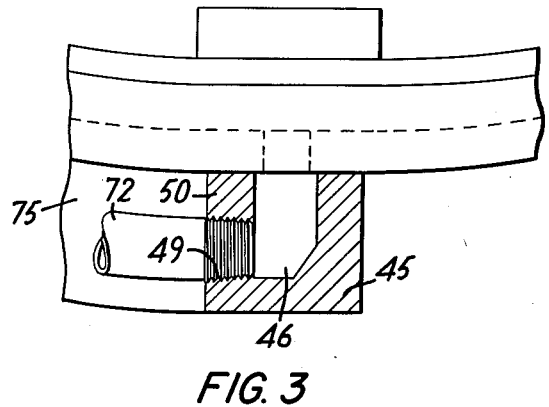
FIG. 3 is a sectional view partly in elevation taken approximately along the line 3—3 in FIG. 2 to show details of the fluid manifold.

As seen in FIG. 2A, the side walls 34 of the gasket 30 diverge slightly so that, when confined in the corresponding recess or channel 22, the side walls press against the sides of the channel and tend to hold the gasket in position against accidental inward displacement by gravity. The angle of divergence of each side 34 of the gasket is suitably about 5°. It will be understood, however, that the shape of the recess internally of the gasket and the thickness of the gasket walls may vary and the invention is not limited to any specific structure. For example, as shown in FIG. 2B, the gasket 30a has an interior annular groove 36a which is triangular in cross section. As in the case of the previously described gasket, the side walls 34a of gasket 30a diverge slightly, e.g. about 5°.

The gaskets are conveniently formed from rubber or rubber composition, this term being used generically to include natural and synthetic rubbers and elastomeric compounds, or compositions having like properties and characteristics. The material is relatively firm and solid but sufficiently resilient and elastic to flow under pressure to conform to the surfaces between which it is confined. Preferably, the gaskets are formed from a rubbery composition which is relatively resistant to attack by hydrocarbon gases and oils. Examples of such resistant rubbery compositions suitable for use with the coupling are Neoprene (polychloroprene) and butadiene-acrylonitrile copolymers, such as those known commercially by the trade designations Buna-N or GR-A. The invention is, however, not limited to these specific materials, and particularly when special resistance to gases and oils is not required, any rubbery composition having the above-noted characteristics may be employed.

Figure 4:
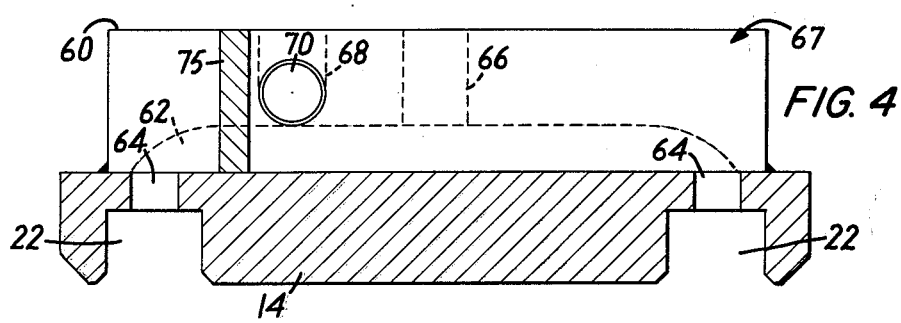
FIG. 4 is a further longitudinal sectional view of the coupling body illustrated as seen approximately along the line 4—4 of FIG. 1.
Figure 5:
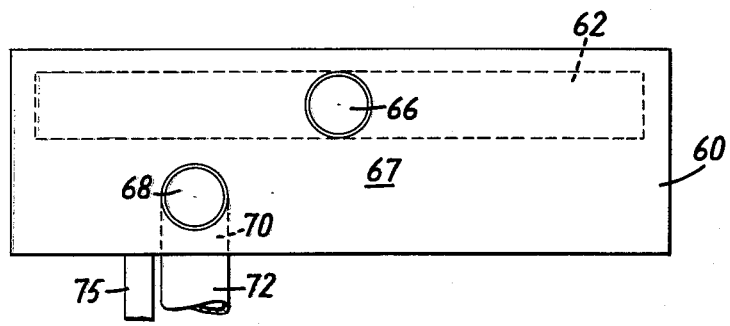
FIG. 5 is a plan view of the fluid charging and discharging assembly shown in FIG. 4.

Means are provided for suppplying gasket-compressing fluids to the annular channels 22 when the coupling is underwater and in position in the submerged pipe line to urge the gasket rings into fluid-tight engagement with the surfaces of the pipe sections being connected. For this purpose, there is provided a lower manifold 45 which extends axially between the ends of the coupling sleeve 14 and is secured thereto in any convenient manner, as by welding. Manifold 45 is a solid body formed with an internal longitudinal channel 46 extending between gasket-receiving channels 22. Radial apertures 48 in the wall of the sleeve 14 provide communication between the ends of channel 46 and the gasket channels or grooves 22. An inlet opening 49 in side wall 50 of manifold 45 opens into channel 46 and provides means for admitting fluid into apertures 48 and then into channels 22. Diametrically opposite lower manifold 45 is an upper manifold 60 (FIGS. 1, 4 and 5) which also extends axially between the ends of the coupling sleeve 14. Like the lower manifold, upper manifold 60 is formed with an internal axially-extending channel 62 having ends which communicate with the gasket channels 22 by means of radial apertures 64 extending through the sleeve wall. An outlet 66 in the outer face 67 of manifold 60 serves to conduct fluid from channel 62 to the exterior of the manifold. Manifold 60 also has a second opening 68 in its outer face which communicates with a side opening 70 which is adapted to be placed in fluid-communicating relationship with the inlet opening 49 of the lower manifold. This connection may be effected in any convenient manner. Thus the openings 49 and 70 are suitably threaded and receive the ends of a pipe or conduit 72 which is bent to conform to the external curvature of tubular sleeve 14, as seen in FIG. 1. In manufacturing the coupling, the upper and lower manifolds are first screwed onto the ends of pipe 72 and then welded into position on the sleeve. Obviously, the pipe 72 may be replaced by tubing or other conduit means and secured in openings 49 and 70 in any other convenient manner, e.g. by welding. To protect the conduit 72 from damage when the coupling is being handled before and during installation, a guard 75 in the form of a radial rib extends between upper manifold 60 and lower manifold 45 closely adjacent the conduit 72. The guard 75, which advantageously has the same radial dimension as the two manifolds, is suitably welded to the surface of the coupling sleeve 14 and to the manifolds. If desired, the guard may also be welded to the conduit 72 in order that the latter will be held firmly in place.

Figure 6:
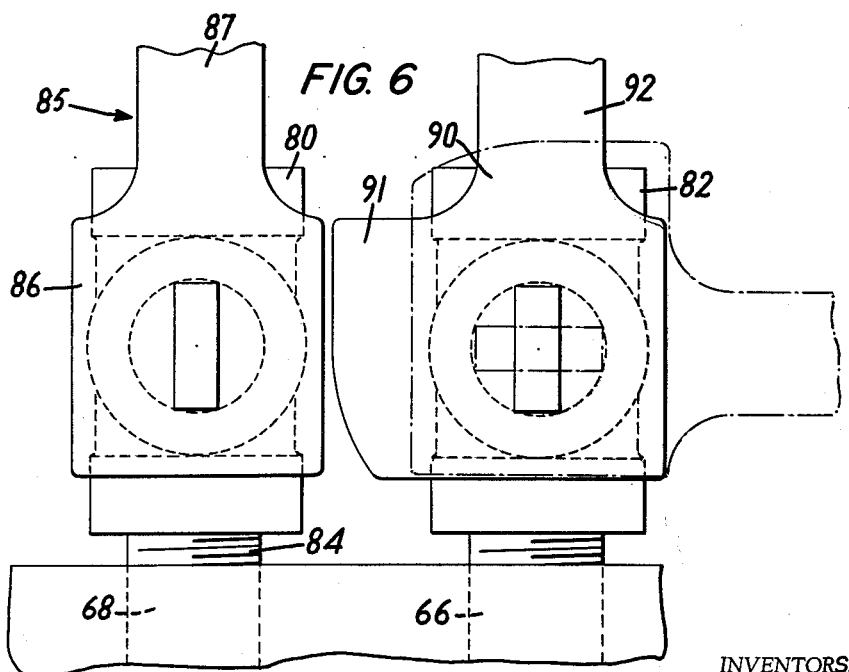
FIG. 6 is an elevational view on an enlarged scale of the inlet and outlet valve assembly shown at the top of FIG. 1.

It will be apparent from the structure above-described that a fluid introduced into inlet opening 68 will flow out opening 70, through conduit 72, into inlet opening 49 of lower manifold 45, and then into channel 46. From channel 46 the fluid will flow through apertures 48 into the gasket channels and the annular grooves 36 of the gaskets. The fluid will press the gaskets 30 radially inwardly into engagement with the surface of pipe 12 and the fluid will rise in the gasket channels 22 until the top of the sleeve is reached. Then the fluid will pass through apertures 64 into manifold channel 62 of manifold 60 and out through outlet opening 66. The extent to which the gaskets are forced against the pipe surface will, of course, depend upon the pressure applied to the liquid being pumped into the coupling. To control the flow of fluid through the above-described circuit, the openings 68 and 66 in upper manifold 60 are fitted with valves 80 and 82, respectively. The openings are suitably threaded and nipples or short lengths of pipe 84 serve to effect the necessary connection with the valves. The valves 80 and 82 are of any convenient structure and in themselves form no part of the present invention. It is a feature of the invention, however, that the valves are inter-related in such manner that the valve controlling the flow of fluid into the coupling through the opening 68 in the upper manifold 60 cannot be closed when the valve controlling the flow of fluid out of the opening 66 is in open position. A convenient manner of providing this inter-relationship is shown by way of example in FIG. 6. As shown, valve 80 is provided with a handle 85 which has a body portion 86 of substantially square configuration and a handle portion 87. Valve 82, on the other hand, is controlled by a handle 90 which has a body portion formed with a cam extension 91, and a handle portion 92. The cam extension 91 is sufficiently close to the body portion 86 of handle 85 that the latter, which is shown in open position, cannot be turned to closed position when handle 90 is in the position shown in solid lines in FIG. 6, i.e. the open position. When, however, handle 90 is moved to the closed position as shown in broken lines in FIG. 6, then the cam extension 91 is carried out of the path of the body portion of handle 85.

Figure 7:
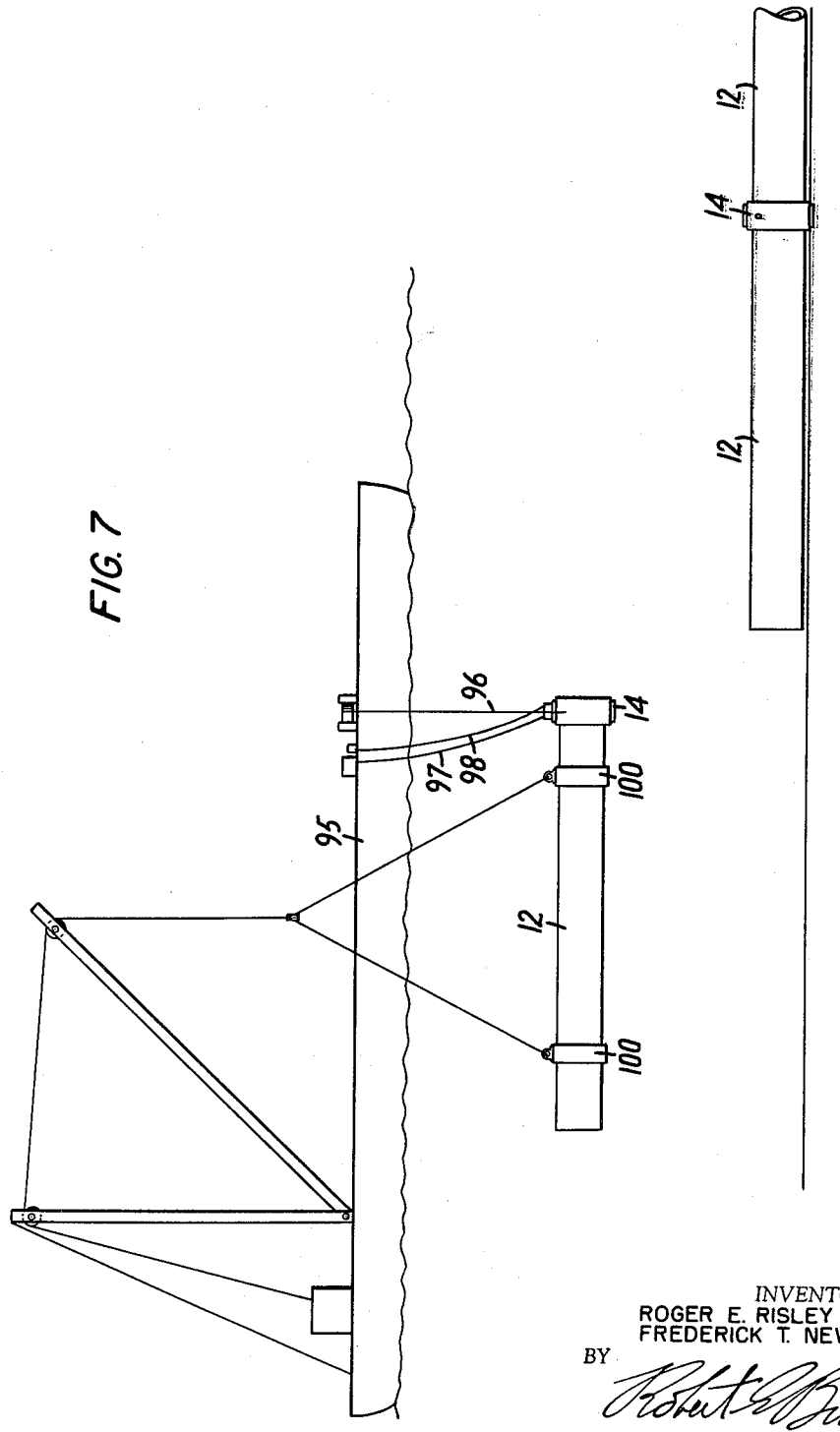
FIG. 7 is a diagrammatic view of the relative relationship of parts found during the underwater installation of the pipe coupling construction shown in FIG. 1 to 6.

When the coupling 10 is installed in the construction of an underwater pipe line, certain auxiliary equipment is necessary. As shown in FIG. 7, the installation is guided from a barge or like boat 95 which provides anchorage for lowering the lines 96, which are connected to the ears 27 when the coupling is lowered into position, and carries the pump which supplies the gasket-compressing fluid into the coupling sleeve 14. Flexible fluid conduits or hoses 97 and 98 (FIG. 1) are adapted to be removably connected to the valves 80 and 82, respectively, in any convenient manner, for example by means of a hose coupling (not shown). A diver is also required for underwater operations during installation and the barge 95 carries the necessary equipment required by the diver.

While various fluids may be employed for acting on the gaskets to press them radially inwardly into sealing engagement with the adjacent pipe surface, particularly suitable for use with the coupling of the present invention is a fluid which is settable and non-shrinking and yet which flows readily before setting. A material which has exceptional properties for this purpose is a special Portland cement grout of the following composition.

Portland cement—100 lb.
Aluminum powder—3 to 15 grams
Water in sufficient quantity to provide a water-cement ratio of 0.25 to 0.35

A greater amount of aluminum powder may be used but is generally unnecessary. 5 to 7 grams of aluminum per 100 lb. of cement have been found to be particularly suitable. This composition is sufficiently fluid to permit pumping, yet is self-setting and non-shrinking so that the initial pressure upon the gasket is maintained during the setting operation and after setting is completed. It will be understood that other self-setting, non-shrinking compositions may be employed and the invention is not limited to the above composition, but optimum results are obtained when such a composition is used. The required quantities of grout or grout-forming ingredients are transported to the sites of installation in any suitable container in the barge 95. Ordinarily, the aluminum powder is not added until just before use. A pump 99 forces the grout through the fluid inlet hose 97 after the coupling has been suitably positioned on the submerged pipe by the diver, the intake of the pump being connected to the grout-supply container (not shown).

To begin the installation operation of the above-described coupling, the gaskets 30 are positioned in the gasket grooves 22 and the new pipe section 12 which is to be installed is inserted into one end of the coupling sleeve, the pipe stops 25 limiting the extent of insertion. The pipe section is then temporarily held in position and supported by a cable and slings 100 as shown in FIG. 7, and the lowering lines 96 are removably secured to the ears 27 of the coupling sleeve. As previously mentioned, the basket grooves 22 have a greater radial dimension than do the gaskets 30 so that the faces of the gaskets are recessed and cannot be damaged upon insertion of the pipe. The fluid inlet and outlet hoses 97 and 98 are then connected with the valves 80 and 82 and both valves placed in open position, as shown in solid lines in FIG. 6. The assembly is then lowered into the water (FIG. 7). Control of the lowering lines is conveniently effected by means of a hand or power winch or the like, as shown diagrammatically in FIG. 7. By reason of the fact that the ears 27 are symmetrically disposed in relation to the axial plane extending through the diametrically positioned lower manifold 45 and upper manifold 60, the sleeve 14 remains in the water with the manifold 45 always at the bottom. The diver has previously descended to the lake or river bottom and stands in position to guide the open end of the coupling sleeve 14 onto the free end of the pipe section 12 which has already been laid. This is a relatively simple operation, the pipe stops 25 automatically determining the position of the pipe section in the coupling sleeve. Since the coupling sleeve is lowered with the lower manifold 45 downwardly, this part of the coupling naturally remains at the lowermost portion of the sleeve. The diver then signals the personnel in the barge 95 to begin pumping the grout or other fluid 99 which is to be used for compressing the gaskets. The grout flows through hose 97 into valve 80 and by means of conduit 72 into channel 46 of the lower manifold. When the coupling sleeve is lowered into the water, a certain amount of water may enter the gasket grooves 22 around the sides of the gaskets. This is in no way harmful, however, since it is a feature of the invention that the entering grout or other fluid, under pressure, gradually forces its way in the grooves 22 upwardly toward the top of the coupling sleeve and the upper manifold 60, pushing the water and/or air which may be in the grooves ahead of it. The water and air, followed by the grout, flow out through valve 82 and outlet hose 98 into the barge. When the operator sees grout flowing from hose 98 he knows that the gasket grooves 22 are full and he signals the diver to close the outlet valve 82 by turning the valve handle 90 to the position shown in dotted lines in FIG. 6. Grout is then pumped into the grooves 22 until the desired pressure is reached. The pressure of the grout in grooves 22 not only forces the gasket rings 30 into firm engagement with the adjacent surfaces of the aligned pipe sections 12, but it also forces the lips 40 of the gasket rings and thus the grout is sealingly confined in the gasket grooves. Generally speaking a pressure of 300 to 1000 pounds per square inch is employed although it will be understood that higher or lower pressures may be employed, depending upon the requirements of the particular installation. After the desired gasket-compressing pressure has been attained, the diver, on signal from the barge operator, closes valve 80 by turning handle 85. The diver then removes the valve handles and detaches the lowering lines 96 from the ears 27 and the hoses 97 and 98 from the valves 80 and 82, and these units are drawn up into the barge. The installation of the coupling and new pipe section is then complete and the cycle is repeated until the pipe line is fully installed.

The coupling described above is of a type which is initially independent of the two pipe sections which it interconnects and provides the desired fluid-tight connection between the pipe sections by means of two axially spaced-apart gaskets, each of which engages the surface of one of the pipes. It will be understood, however, that various changes and modifications may be made in the coupling structure without departing from the invention. For example, the coupling may be rigidly connected to one of the pipe sections, e.g. by welding, and form a connection by means of a gasket with only one of the pipes to be connected. Such a construction is in the nature of a bell and spigot joint.

Figure 8:
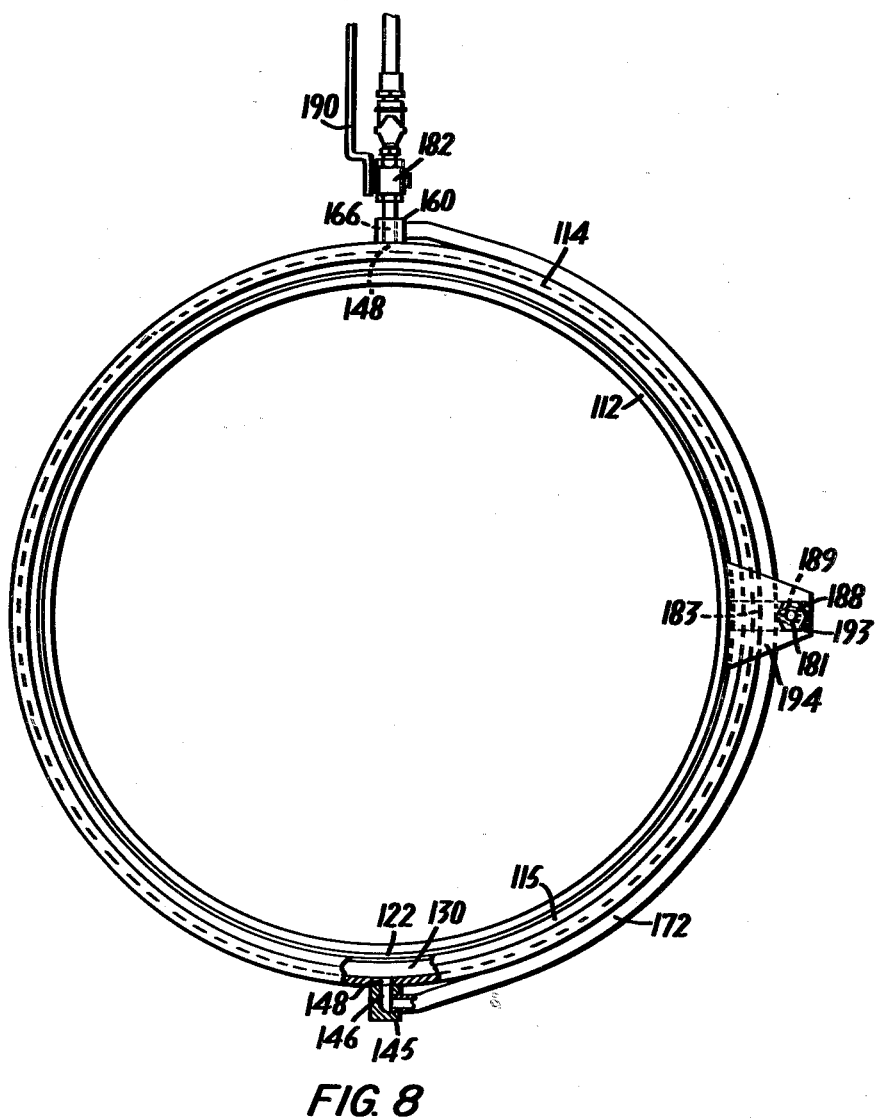
FIG. 8 is an end elevational view, partly in section, showing a coupling construction in the nature of a bell and spigot joint.
Figure 9:
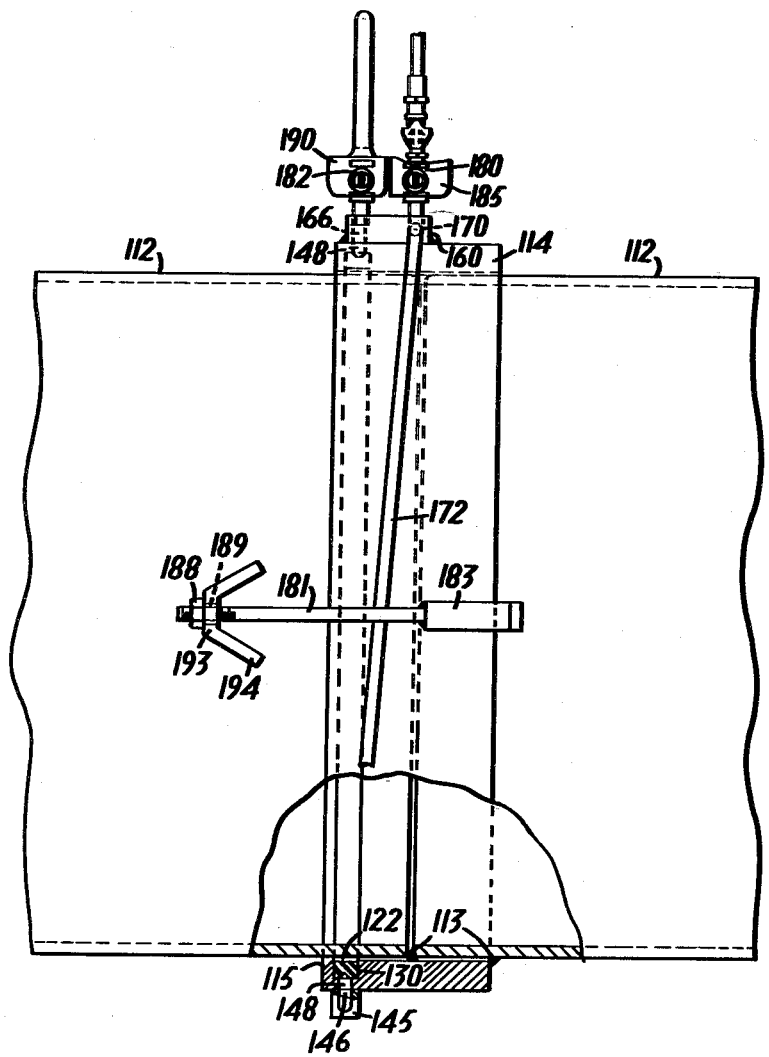
FIG. 9 is a side elevational view, partly in section, of the construction shown in FIG. 8.

Thus, referring to FIGS. 8 and 9, wherein parts corresponding to those shown in FIGS. 1 to 7 have been given like reference numerals to which 100 has been added, there is shown an embodiment of the invention having this type of construction. The coupling sleeve 114 has an internal diameter slightly greater than the external diameter of pipe sections 112 and it is welded, as indicated at 113, to one of these pipe sections to form a permanent fluid-tight connection with it. The free end of the sleeve 114, into which the other pipe section 112 is introduced, is tapered at 115 and is formed with an annular gasket channel or recess 122 in which is seated a gasket 130 having the general construction of the gasket 30a shown in FIG. 2B, i.e. having an annular groove of substantially triangular cross section. The gasket channel 122 has the form of the channels 22 of sleeve 14. For introduction of the above-described grout or other fluid for urging the gaskets into sealing relationship, sleeve 114 is provided at its lower end with an inlet member 145 which is formed with an interior channel 146 communicating with a radial aperture 148 extending through the wall of the sleeve into gasket groove 122. Fluid is supplied to inlet member 145 by means of a conduit 172 which overlies the surface of sleeve 114 and is bent to conform substantially to the curvature of that surface. At its upper end the conduit 172 communicates with a channel 170 in an upper manifold 160 to which the gasket-urging fluid is supplied through a valve 180. The upper manifold 160 is also formed with an outlet opening 166 which communicates with a second radial aperture 148 extending through the sleeve wall into gasket channel 122. Flow of fluid through outlet 166 is controlled by a valve 182. As in the case of valves 80 and 82, valves 180 and 182 are provided with interlocking handles 185 and 190, respectively.

In order to provide a guard for the inlet conduit 172 and at the same time to hold the pipes against undue axial displacement, there is provided an anchor bolt 181 which has a base portion 183 secured as by welding to the exterior of sleeve 114, the anchor bolt 181 being threaded at its free end to receive a nut 188. The anchor bolt is received in an aperture 189 formed in a lug 193 secured, as by welding, to the pipe section 112, the lug 193 suitably having the form shown in FIGS. 8 and 9 with diverging side extensions 194.

The installation of pipe sections 112 is effected substantially as described in connection with the embodiment of FIGS. 1 to 7, the end of each pipe section with the rigidly attached coupling sleeve, i.e. the "bell" end of the pipe section being guided by the diver onto the plain or "spigot" end of the pipe section which has already been laid in place. The coupling sleeve 114 may be welded to the pipe 112 just before installation as the pipe line is being laid or the pipe and sleeve may be united beforehand, e.g. at the time of manufacture.

There is thus provided a method of installing a pipe coupling which is eminently suited for underwater pipe installations, which insures optimum sealing action and which can be effected with minimum handling by a diver. It will be obvious that the diver can perform his function rapidly and by feel so that the presence of silt on the lake or river bottom presents no problem. He needs only to guide the coupling, with its accompanying pipe section, onto the previously laid pipe section, the positioning of the pipe takes place automatically and the sealing of the coupling sleeve to the pipe sections make the desired fluid-tight joint is controlled entirely from above the surface of the water.

It will be understood that various changes and modifications in addition to those above-mentioned may be made in the embodiments described and illustrated without departing from the scope of the invention as defined in the appended claims. For example, the inlet for the gasket-urging fluid may be controlled by a check valve instead of by a manual valve as shown. The outlet valve may in some circumstances be eliminated altogether and the outlet opening may be closed by means of a plug after the gasket-receiving channel or channels has been flushed and filled with grout or other gasket-urging fluid, the plug being inserted by the installer at the appropriate time.

It will be further understood that, insofar as they are not mutually incompatible, the individual features of the various embodiments described and shown in the drawings are interchangeable with one another. It is intended, therefore, that all matter contained in the foregoing description and in the drawings shall be interpreted as illustrative only and not as limitative of the invention.

This application is a division of our application Serial No. 547,514, filed November 17, 1955, now Patent No. 2,922,664, dated January 26, 1960.

What we claim and desire to secure by Letters Patent is:

1. A method of coupling submerged sections of a pipe in fluid-tight aligned position adapted to be carried out under water and even under low-visibility under water conditions with a coupling of the type comprising a tubular sleeve carring radially-movable gaskets seated in annular recesses and provided with valves for controlling the flow of fluid into and out of said recesses which comprises inserting a pipe section in one end of the sleeve and securing it therein, removably connecting fluid-conducting lines with said valves and removably connecting lowering lines to said sleeve, lowering the pipe section with the sleeve secured thereto into the water by lowering means at the situs of a submerged pipe section already laid, inserting the submerged laid pipe section into the other end of said coupling while said laid pipe section and said coupling are fully submerged, manually opening said valves while said valves are submerged, pumping fluid under pressure through said fluid-conducting lines and said valves into said recesses from the bottom of said submerged sleeve for urging said gaskets radially inwardly into engagment with the associated pipe sections while withdrawing fluid from the top of said sleeve, manually closing said valves while said valves are submerged, and disconnecting said fluid conducting lines and said lowering lines from said sleeve while said sleeve is submerged, only said inserting, said opening, said closing and said disconnecting being performed underwater.

2. A method of coupling submerged sections of a pipe in fluid-tight aligned position adapted to be carried out under water and even under low-visibility underwater conditions with a coupling of the type comprising a tubular sleeve carrying radially-movable gaskets seated in annular recesses and provided with valves for controlling the flow of fluid into and out of said recesses which comprises inserting a pipe section in one end of the sleeve and securing it therein, removably connecting fluid conducting lines with said valves and removably connecting lowering lines to said sleeve, lowering the pipe section with the sleeve secured thereto into the water by lowering means at the situs of a submerged pipe section already laid, inserting the submerged laid pipe section into the other end of said coupling while said laid pipe section and said coupling are fully submerged, manually opening said valves while said valves are submerged, pumping grout under pressure through said fluid-conducting lines and said valves into said recesses from the bottom of said submerged sleeve for urging said gaskets radially inwardly into engagement with the associated pipe sections while withdrawing grout from the top of said sleeve, manually closing the valve through which the grout is withdrawn while said valve is submerged, pumping said grout into said sleeve to a predetermined hydraulic pressure, manually closing the valve admitting said grout while said valve is submerged, and disconnecting said lines and said lowering lines from said sleeve while said sleeve is submerged, only said inserting, said opening, said closing and said disconnecting being performed underwater.

References Cited in the file of this patent

UNITED STATES PATENTS

| | | |
|---|---|---|
| 198,146 | Painter | Dec 11, 1877 |
| 375,464 | Thacher et al. | Dec. 27, 1887 |
| 672,475 | Vavallaro | Apr. 23, 1901 |
| 907,357 | Hoff | Dec. 22, 1908 |
| 1,800,085 | Kroeger et al. | Apr. 7, 1931 |
| 2,011,824 | Pearson | Aug. 20, 1935 |
| 2,083,842 | Henning | June 15, 1937 |
| 2,323,179 | Hall et al. | June 29, 1943 |
| 2,469,516 | Pearson | May 10, 1949 |
| 2,502,351 | Smith | Mar. 28, 1950 |
| 2,538,683 | Guiler | Jan. 16, 1951 |
| 2,593,491 | Saunders | Apr. 22, 1952 |
| 2,650,840 | Risley | Sept. 1, 1953 |
| 2,660,778 | Gerner | Dec. 1, 1953 |
| 2,691,460 | Barnebey | Oct. 12, 1954 |
| 2,787,051 | Risley | Apr. 2, 1957 |

FOREIGN PATENTS

| | | |
|---|---|---|
| 301,066 | Great Britain | Oct. 3, 1929 |
| 532,657 | Great Britain | Jan. 29, 1941 |